United States Patent [19]

Lindberg

[11] 4,112,892

[45] Sep. 12, 1978

[54] COMBUSTION CONTROL SYSTEM FOR ADDING FLUID ABOVE THE BUTTERFLY VALVE

[75] Inventor: John E. Lindberg, Berkeley, Calif.

[73] Assignee: Owen, Wickersham & Erickson, San Francisco, Calif.

[21] Appl. No.: 793,556

[22] Filed: May 4, 1977

[51] Int. Cl.² ............................................. F02M 25/06
[52] U.S. Cl. .............................. 123/119 A; 123/25 E; 123/119 B
[58] Field of Search ............ 123/119 A, 119 B, 25 E, 123/25 F; 137/803–809, 810, 811, 812, 813

[56] References Cited

U.S. PATENT DOCUMENTS

| 3,208,462 | 9/1965 | Fox et al. | 137/811 |
|---|---|---|---|
| 3,431,930 | 3/1969 | Bowles | 137/806 |
| 3,458,237 | 7/1969 | Noe | 137/809 X |
| 3,530,842 | 9/1970 | von Brimer | 123/119 A |
| 4,027,635 | 6/1977 | Jidosha et al. | 123/119 A |
| 4,066,052 | 1/1978 | Moore | 123/119 A |

FOREIGN PATENT DOCUMENTS

| 1,550,510 | 3/1970 | Fed. Rep. of Germany | 137/812 |
|---|---|---|---|
| 383,941 | 8/1973 | U.S.S.R. | 137/808 |

*Primary Examiner*—Wendell E. Burns
*Attorney, Agent, or Firm*—Owen, Wickersham & Erickson

[57] ABSTRACT

A combustion control system adds fluid to the air fuel mixture of the induction system of an internal combustion engine in response to the engine's need for the added fluid to improve combustion, to increase power, to improve efficiency, and to reduce emissions.

The combustion control system includes a variable impedance, fluidic control mechanism which produces an impedance to flow through the mechanism which varies in relationship to the pressure differential applied across and to an acceleration of flow through the control mechanism. In one embodiment, the variable impedance flow control mechanism is a vortex chamber, and in another embodiment it is a Venturi. Both embodiments have an outlet which is connected to the induction system above the butterfly valve of the engine.

A second variable impedance fluidic control mechanism controls the mixing of air with PCV gases in response to suction in the induction system of the engine; this second control has an outlet which is connected below the butterfly valve.

Both variable impedance flow control mechanisms can incorporate shaped inlets for providing a swirl and a controlled choking in the inlets to the flow control mechanisms.

The outlet of each variable impedance flow control mechanism also preferably has an inner surface which is configured to produce high turbulence and ultrasonic wave fronts in the fluid flow from the outlet.

13 Claims, 4 Drawing Figures

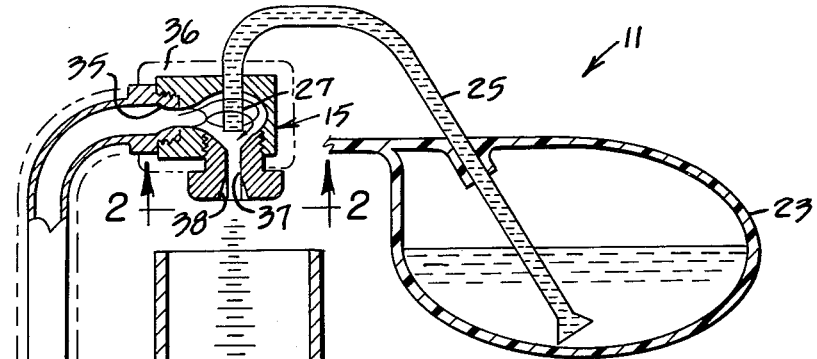
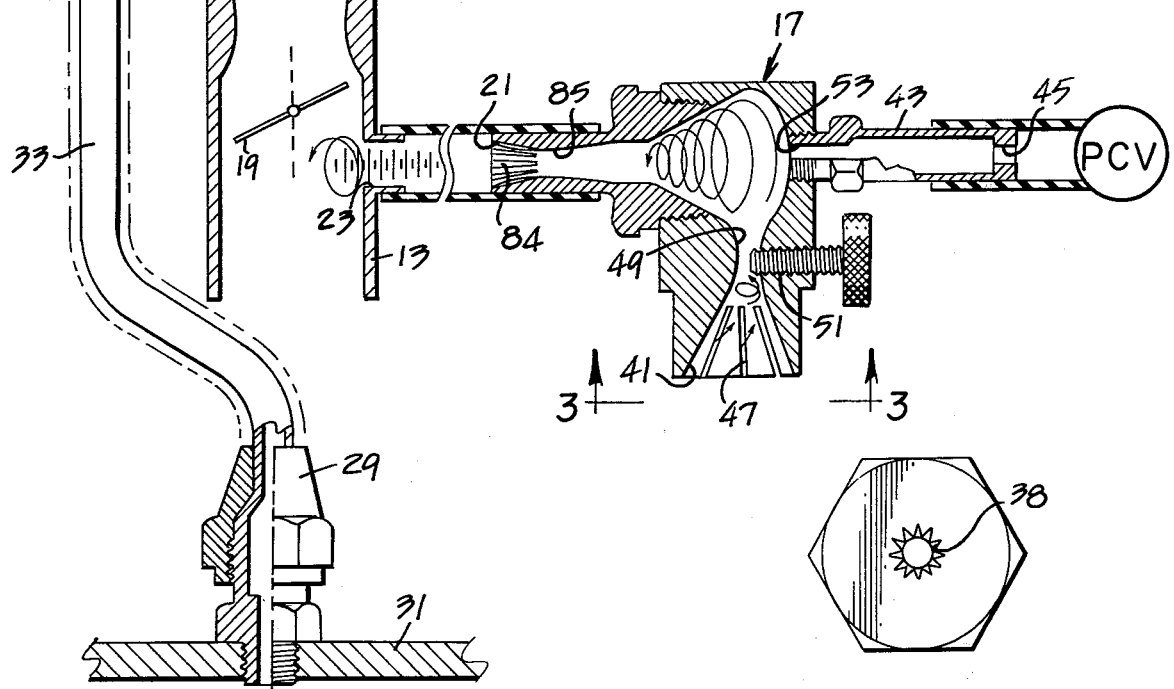
FIG. 1.
FIG. 2.
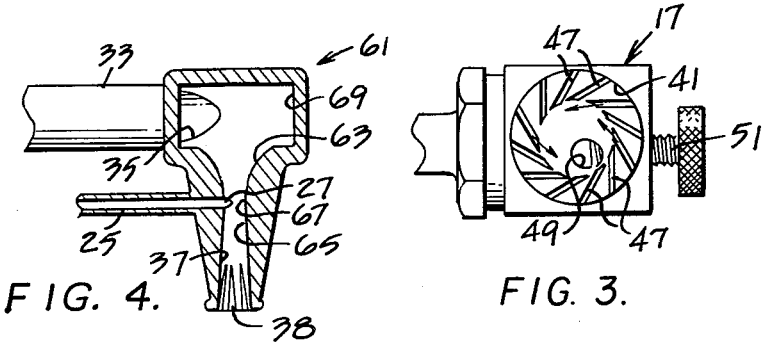
FIG. 4.      FIG. 3.

COMBUSTION CONTROL SYSTEM FOR ADDING FLUID ABOVE THE BUTTERFLY VALVE

BACKGROUND OF THE INVENTION

Adding liquids, such as water or water vapor, to the induction system of an internal combustion system is an idea which is in itself quite old. However, the comprehension of the full benefits to be obtained by proper regulation of the amount of added liquid (along with a proper amount of associated heat energy) at all conditions of engine operation have been lacking; and the prior art apparatus and techniques for adding liquid have been inadequate to fully accomplish all the desired results.

The engine needs different amounts of fluid at varying conditions of operation of the engine. The engine's need for fluid at any particular condition of operation is dependent on the amount of fluid which will produce the best engine operation at that condition. The best engine operation includes obtaining complete lean, clean combustion with the lowest emissions of HC, CO and $NO_x$ and best fuel economy without detonation, pre-ignition, or after fire (dieseling). The engine's need for fluid varies widely from no fluid at all under certain conditions of operation to amounts of fluid flow in the same order of magnitude of fuel flow at other conditions of engine operation. For example, the engine's need for fluid is zero at engine shut-off as no liquid can be permitted to flow into the engine when the engine is shut off. If the liquid flow into the engine were to be permitted at shut-off, corrosion and/or liquid lock will occur.

At normal, steady-state, low-speed idle, only a trace amount of fluid, or no fluid at all, is required to give optimum low idle emissions.

Increasing quantities of fluid proportionate to power are required as engine power is increased at each steady state point.

Under dynamic conditions, such as, for example, acceleration at high BMEP, an extra amount of fluid is required over and above operation at a steady state condition; and, in the case where the fluid is steam, the steam should be of a lower quality, that is, with a certain percentage of water droplets carried with the steam (in order to give maximum combustion cooling) to keep nitrous oxide emissions within satisfactory limits.

On deceleration, less fluid is required at each point in the deceleration than would be desired for operation at a steady state at any point.

The engine's need for fluid is also determined by limiting the fluid to an amount that will not hurt the combustion. For instance, in deceleration, if fluid is not limited, too much fluid can be introduced to cause the combustion to be poor. This will produce incomplete combustion and will cool the flame sufficiently that undesirable amounts of HC and CO will be produced. Engine efficiency can be seriously impaired. Hydrocarbon deposits also increase.

On acceleration, the engine's need for fluid is dependent on introducing the right amount of fluid to absorb, by its high specific heat plus latent heat of evaporization of liquid droplets included (water droplets in the case of steam) plus heat of dissociation, excess engine heat generation, which would otherwise go toward producing high combustion and surface peak temperatures and peak pressures at about top dead center (but this still must be done without introducing too much fluid so as to impair combustion with the undesirable effects noted above). By introducing the right amount of additional fluid, the energy is absorbed as energy in steam (in the case where the fluid is water) which is given back during the latter part of the cycle as expansion of the steam. This adds smoothly at favorable crank angle to the power stroke and torque of the engine. The right amount of additional fluid at this point, therefore, prevents hot spots and smooths the pressure and temperature and energy conversion.

Also, the right amount of fluid needs to be introduced to provide for engine cleanliness. The right amount of fluid will provide both clean combustion and removal of engine deposits.

Further, it is needed to inject the right amount of fluid in order to heat and thereby to vaporize the fuel to provide equal fuel-air ratio distribution and mass distribution between the cylinders. This gives maximum economy and lowest emissions.

Extra charge density can be provided by introducing fluid droplets in the fuel-air mixture charge at full throttle or high power operation. The fluid droplets, if introduced into the cylinder at the proper time before valve closure, cool the charge so as to increase the charge density before the valve closure, and thus, in effect, provide a form of supercharging.

The prior art has not recognized these problems and has not implemented any control mechanism effective to produce the benefits which can be obtained by controlling the amount of added fluid and heat energy in response to engine need at each condition of operation of the engine.

It is a primary object of the present invention to control the added amount of fluid and heat energy in relation to engine need at all conditions of operation of the engine to obtain the benefits as described above.

It is a further object of the present invention to combine non-moving part PCV gas control mechanism with the control that regulates the amount of liquid and heat so that these two controls properly complement each other in the operation of the engine.

SUMMARY OF THE INVENTION

The present invention provides a combustion control system which acts as a fluidic computer for regulating the amount of liquid added to the induction system of the engine and which also combines the proper amount of heat from the exhaust gases with the added liquid for all conditions of engine operation in response to engine need.

The fluidic computer includes a variable impedance flow control mechanism (in the form of a vortex chamber or a Venturi) which produces an impedance to exhaust gas flow through the mechanism which varies in relationship to the pressure differential of the exhaust gases across the control mechanism and which also varies in relationship to an acceleration of flow through the control mechanism.

The vortex chamber or Venturi has an outlet end of the liquid conducting conduit so located within the vortex chamber or Venturi as to produce increased suction on the liquid outlet tube end with increasing exhaust gas flow so that the amount of liquid is increased with increasing power levels of the engine.

Air is added to the PCV gases and is intimately mixed with the PCV gases by a second variable impedance flow control means which also has an impedance that varies in relationship to the pressure differential across and to an acceleration of flow through the control mechanism. In a preferred embodiment of the present invention, this control mechanism is a vortex chamber having two inlets—one for air and one for the PCV gases. The mixed air and PCV gases are transmitted through an outlet of the vortex chamber to the ported vent of the engine induction system below the butterfly valve.

The air-PCV gas vortex chamber provides a significant amount of bleed air at high power levels of operation of the engine to provide increased turbulence and mixing of air with PCV gases over what is provided with the normal PCV gas connection to an engine and also provides a substantial amount of bleed air at engine idle operation to lean out air fuel mixture desirably under this condition of engine operation.

The variable area inlet for the air to the vortex chamber permits matching of the amount of inlet air at idle to provide an amount which is satisfactory while still permitting some significant amount of bleed air at other conditions of engine operation. Under all conditions of operation the turbulence produced by the air PCV vortex chamber produces desirable results.

The air-PCV vortex chamber of the present invention permits the normal mechanical PCV valve to be totally eliminated and provides, in effect, a variable PCV control valve without any moving parts.

Combustion control system apparatus and methods which incorporate the structural features noted above, and which are effective to function in the ways described above constitute further specific objects of the present invention.

Other and further objects of the present invention will be apparent from the following description and claims, and are illustrated in the accompanying drawings, which, by way of illustration, show preferred embodiments of the present invention, and the principles thereof and what are now considered to be the best modes contemplated for applying these principles. Other embodiments of the invention, embodying the same or equivalent principles may be used, and structural changes may be made as desired by those skilled in the art without departing from the present invention and the purview of the appended claims.

BRIEF DESCRIPTION OF THE DRAWINGS

FIG. 1 is a side elevation view, partly in cross section to show detail of construction, of a combustion control system incorporating both a liquid dispensing vortex chamber and an air-PCV gas vortex chamber and constructed in accordance with one embodiment of the present invention.

FIG. 2 is an enlarged bottom plan view taken along the line and in the direction indicated by the arrows 2—2 in FIG. 1 and shows a plurality of minute notches formed in the inner surface of the outlet opening of the liquid vortex chamber for producing localized shear and an ultrasonic effect as a result of such localized shear, of the spinning gases accelerated by the vortex chamber.

FIG. 3 is a fragmentary, enlarged bottom plan view taken along the line and in the direction indicated by the arrows 3—3 in FIG. 1.

FIG. 4 is a fragmentary cross section view of another embodiment of a variable impedance flow control device in the form of a Venturi which can be substituted for the liquid vortex chamber 15 shown in FIG. 1.

DESCRIPTION OF THE PREFERRED EMBODIMENTS

A combustion control system incorporating both an exhaust driven, liquid dispensing vortex chamber and air-PCV gases vortex chamber and constructed in accordance with one embodiment of the present invention is indicated generally by the reference numeral 11 in FIG. 1.

The system 11 is shown associated with the fuel air intake manifold 13 of an internal combustion engine, and comprises an exhaust gas driven liquid dispensing vortex chamber 15 and an air-PCV gas vortex chamber 17. PCV refers to the gases produced by positive crankcase ventilation.

The liquid vortex chamber 15 is shown positioned above the butterfly valve 19 of the engine carburetor.

The air-PCV gas vortex chamber 17 is connected to the PCV opening 23 below the butterfly valve 19.

The system 11 includes a liquid reservoir 23 and a conduit 25 for conducting liquid from the reservoir 23 to the liquid vortex chamber 15.

The conduit 25 has an end portion 27 which extends downward a short distance into the interior of the liquid vortex chamber 15, for purposes which will be described in greater detail below.

The system 11 also includes a fitting 29 connected to the exhaust gas manifold 31 at a position closely adjacent to an exhaust valve of an engine cylinder. A conduit 33 transmits the exhaust gases from the opening in the exhaust manifold to an inlet 35 of the liquid vortex chamber.

The liquid vortex chamber 15 has an outlet 37 located adjacent to but slightly spaced from the open upper end of the manifold pipe 13 as illustrated in FIG. 1.

In the case of a fuel injected engine, the vortex chamber outlet 37 is, as noted, located above the butterfly 19. In the case of an engine having a carburetor, the outlet 37 is located above the inlet to the carburetor.

In either event, the swirl that is imparted to the gases flowing from the outlet 37 of the vortex chamber serves to provide a beneficial turbulent mixing of the outlet of the vortex chamber with the air of the fuel air mixture in the induction system, and also serves to some extent to induce additional air into the system by an ejector effect.

In addition, as best illustrated in FIG. 2, the minute notches 38 formed in the periphery of the outlet opening 37 provide a shearing effect which in turn provides an ultrasonic effect on the gases ejecting from the outlet opening 37, and thus further enhances mixing because of the large number of wave fronts (illustrated diagramatically in FIG. 1) produced by the ultrasonic effect.

The interior surface of the vortex chamber itself produces an acceleration of the gases in a spinning direction, and the novel configuration of the outlet 37 further accelerates the spinning gases while the notches 38 (preferably formed as a Dermott sine wave configuration rather than the sharp edged notches shown) multiply the localized velocities of the gases by the shearing action and by the number of notches provided to produce an ultrasonic wave form in the outlet gases with a very large number of individual wave fronts for maximizing turbulent mixing.

This same structure can be embodied in the inner surface of the opening 21 of the outlet of the air-PCV gas vortex chamber 17 described in more detail below.

In the operation of the liquid vortex chamber 15, the exhaust gases transmitted through the conduit 33 produce a pressure differential between the inlet 35 and the outlet 37 of the vortex chamber, and the principle of operation of the vortex chamber provides that the flow through the vortex chamber is dependent upon the square root of this pressure differential.

The exhaust gases from the conduit 33 come into the interior of the vortex chamber 15 at a tangent, and produce a swirling motion within the interior of the vortex chamber. The conservation of angular momentum involved in the operation of the vortex chamber then requires that the speed of rotation of these swirling gases be increased as the inside diameter of the vortex chamber decreases as the gases go from the inlet 35 to the outlet 37. This swirl produces an impedance to flow which increases with increased flow velocities produced by increased volume flow.

The swirling pattern of the gases within the vortex chamber also produces a vacuum or suction condition around the tube end 27, and the suction draws liquid through the conduit 25 in proportion to the magnitude of the vacuum produced. Thus, as the pressure of the exhaust gases in the conduit 37 increases with higher power levels of operation of the engine, the velocity of the spinning gases within the vortex chamber 15 increases and a greater suction is produced at tube end 27, and more liquid is drawn through the conduit 25. This provides the desired increase of the amount of liquid introduced into the engine with increased power levels of engine operation.

As illustrated in FIG. 1, insulation is preferably provided about the conduit 33 and vortex chamber 15 to maintain the heat of the exhaust gases introduced into the vortex chamber.

The air-PCV gas vortex chamber 17 preferably includes a shaped inlet 41 for admitting air and a conduit 43, having an internal control orifice 45, for admitting PCV gases. However, this shaped inlet and swirl produced by slots 47 (as described in more detail below) are not essential. The vortex chamber 17 can be used alone with a straight inlet.

The shaped air inlet 41 includes a plurality of slots 47 which, as best illustrated in FIG. 3, are disposed tangentially to the inner surface of the opening 41 for providing swirling motion of the incoming air in the direction indicated by the arrows in FIG. 3. This, in effect, produces two vortexes in series—a vortex within the inlet and a second vortex within the vortex chamber 17.

The curved opening 41 tapers down to a throat 49 and an adjustable screw 51 enables the effective diameter of the throat to be varied. The adjustable screw 51 can, in a preferred form, be arranged coaxially with the axis of the orifice 49 to eliminate any flow distortion during all adjustments of the screw 51.

The throat 49 opens into the interior of the vortex chamber 17 on a tangential path so that the incoming air produces a swirling motion with the vortex chamber.

The end 53 of the PCV gas conduit 43 is aligned axially and on the center of the swirling gases, so that the swirling gases produce a suction effect on the end 53. As in the case of the liquid vortex chamber, the general principle of operation of the air-PCV vortex chamber 17 is to produce a mass flow through the vortex chamber which is dependent upon the pressure differential between the inlet and the outlet of the vortex chamber and the acceleration of flow within the vortex chamber. However, the air-PCV vortex chamber 17 in the FIG. 1 embodiment of the present invention has an entrance construction which regulates the mass flow through the vortex chamber in dependence upon the restricting or choking effect produced by the spin imparted to the air flowing through the shaped opening 41. Thus, the shaped opening 41, in combination with the slots 47 and the adjustable screw 51 at the throat 49 provide for controlled variation of the mass flow through the air-PCV vortex chamber 17, and this control acts in series with the regulation of the mass flow provided by the spin imparted by the inner surface of the vortex chamber itself.

The inner surface 85 of the outlet 23 of the vortex chamber 17 is preferably formed with grooves 84 which produce turbulent mixing and an ultrasonic effect as described above for the groove 38.

In a particular embodiment of the system 11, the tube 33 is a standard ¼ inch tube having an internal diameter of 0.175 inch.

The largest internal diameter of the vortex chamber 15 is 0.46 inches. The minimum diameter of the throat 35 is 0.185 inch. The minimum internal diameter of the outlet 37 is 0.153 inch.

The conduit 25 is standard ⅛ inch outside diameter neoprene tubing.

The internal diameter of the tube 27 is 0.032 inch.

The diameter of the orifice 45 is 0.1 inch.

The internal diameter of the inlet 53 is 0.210 inch. The maximum internal diameter of the vortex chamber 17 is 0.750 inch.

The minimum diameter of the throat 49, without adjustment of the screw 51, is 0.3125 inch. The screw 51 permits the diameter to be adjusted down to 0.156 inch.

The minimum diameter of the outlet throat 85 is 0.25 inch. The maximum depth of the slots 38 and 84 is 0.05 inch.

The slots 47 have a width of approximately 0.05 inch.

In the operation of the air-PCV gas vortex chamber 16 shown in FIG. 1, the maximum pressure differential between the inlet 41 and the outlet 21 of the vortex chamber 17 occurs at idle, but the PCV-gas flow through the conduit 43 under idle operation of the engine is basically the same as throughout the normal cruising power range. This results because the construction and operation of the inlet 41 provide a choking effect under high engine intake manifold vacuum conditions to restrict intake air flow through the shaped opening 41 and this restriction works in combination with the mass flow stabilizing effect of the vortex chamber itself under changing vacuum conditions within the intake manifold, to provide a substantially stabilized flow of PCV gases throughout the operating range of the engine. In this regard, the spinning and restricting effect of the shaped opening 41 decreases as the vacuum below the butterfly valve decreases to permit freer flow of air through the throat 49 into the vortex chamber 17 as the engine power levels go up.

FIG. 4 shows another embodiment of the present invention in which the variable impedance flow control device for mixing the liquid with the exhaust gases is a Venturi instead of the vortex chamber 15 shown in FIG. 1 of the embodiment.

In the FIG. 4 embodiment, the variable impedance control Venturi is indicated generally by the reference numeral 61.

Other parts in the FIG. 4 embodiment which correspond to like parts in the FIG. 1 embodiment are indicated by the same reference numerals.

In the FIG. 4 embodiment, the Venturi is formed by the converging diverging surfaces 63 and 65, forming a throat of minimum diameter at 67. The end 27 of the liquid outlet tube is located at the throat 67, which is the point of greatest suction in the Venturi.

The exhaust gas line 33 has an outlet end 35 which can be located tangentially with the side wall of a swirl chamber 69 located ahead of the inlet 63 of the Venturi (as illustrated in FIG. 4) so as to cause a swirl and controlled choking of the inlet 63 of the Venturi, or the exhaust line 33 can open directly into the center of the chamber above the converging entrance 63 of the Venturi, so as not to cause any swirl in this Venturi entrance.

The controlled swirl and choking provided by the tangentially aligned inlet 35 as illustrated in FIG. 4 provides the advantage of more turbulent mixing of the exhaust gases and liquid and also provides a control function of reducing the amount of exhaust that is introduced with increasing exhaust gas pressure (as compared to a straight inlet of exhaust gases without swirl). The increased turbulence and increased mixing is advantageous, and the control variable provided by the swirl may be advantageous in certain circumstances for matching the amount of the introduced water to a particular engine's operation.

While I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A combustion control system for adding a fluid to the air-fuel mixture of the induction system of an internal combustion engine in response to engine need for the added fluid to improve the combustion of the fuel, said system comprising
    variable impedance flow control means for producing an impedance to flow through the control means which varies in relationship to the pressure differential across the flow control means and which also varies in relationship to an acceleration of flow through the variable impedance flow control means,
    outlet means connecting the outlet of the variable impedance flow control means to the induction system of the engine,
    input means for supplying a liquid and engine exhaust gases to the inlet of the variable impedance flow control means, and
    wherein the outlet means include an outlet positioned above the butterfly valve of the engine.

2. The invention defined in claim 1 wherein the variable impedance flow control means include a vortex chamber.

3. The invention defined in claim 1 wherein the variable impedance flow control means include a Venturi.

4. The invention defined in claim 1 wherein the input means include a source of liquid and a conduit for conducting liquid from the source to the control means, and wherein the conduit includes a tube end located within the control means at a point of high suction produced by the flow of exhaust gases through the control means.

5. The invention defined in claim 1 wherein the outlet means comprises a conduit having an inner surface formed with a plurality of small grooves which provide increased turbulent mixing and an ultrasonic shock wave effect in the fluid flowing through said outlet and into the induction system of the engine.

6. The invention defined in claim 1, including a second variable impedance flow control means for producing an impedance to flow through the second means which vary in relationship to the pressure differential across and to an acceleration of flow through the second flow control means, second outlet means connecting the outlet of the second variable impedance flow control means to the induction system of the engine, and second input means for supplying both air and PCV gases inlet of the second variable impedance flow control means.

7. The invention defined in claim 6 wherein the second variable impedance flow control means comprise a vortex chamber.

8. The invention defined in claim 7 wherein the second input means comprise a first inlet for admitting air and a second inlet for admitting PCV gases.

9. The invention defined in claim 8 wherein the second inlet includes a control orifice for controlling the flow of PCV gases.

10. The invention defined in claim 9 wherein the air inlet includes a shaped opening having a throat of reduced cross sectional area and including adjustment means for varying the cross sectional area of the throat.

11. The invention defined in claim 10 wherein the air inlet comprises a shaped opening having slots extending through the side wall of the opening, and disposed with respect to the inner surface of the shaped opening for causing a swirl and controlled choking of the flow of air through the shaped opening.

12. The invention defined in claim 11 wherein the outlet means include an outlet having an inner surface formed with a plurality of grooves for providing turbulent mixing and an ultrasonic effect in the mixed air and PCV gases flowing through said outlet and transmitted into the induction system of the engine.

13. The invention defined in claim 6 wherein the second variable impedance flow control means includes an outlet wherein the second outlet means of the second variable impedance flow control means is connected to the ported vent of the induction system below the butterfly valve.

* * * * *